US007163981B2

United States Patent
Kubish et al.

(10) Patent No.: US 7,163,981 B2
(45) Date of Patent: Jan. 16, 2007

(54) AQUEOUS PAINT COMPOSITION AND USES THEREOF

(75) Inventors: Scott Kubish, Ann Arbor, MI (US); Jesse Fritcher, Lansing, IL (US); Eitarou Shimotsuma, Lansing, IL (US); Takashi Watanabe, Hirakata (JP)

(73) Assignee: Toyota Technical Center, U.S.A, Inc. et al., Ann Arbor, MI (US)

( * ) Notice: Subject to any disclaimer, the term of this patent is extended or adjusted under 35 U.S.C. 154(b) by 352 days.

(21) Appl. No.: 10/911,271

(22) Filed: Aug. 4, 2004

(65) Prior Publication Data

US 2006/0030651 A1   Feb. 9, 2006

(51) Int. Cl.
C09J 133/06   (2006.01)
C09J 175/06   (2006.01)
C09J 201/00   (2006.01)

(52) U.S. Cl. ........................ 525/125; 524/507; 524/522; 524/523; 525/194; 525/221; 525/222; 525/330.2

(58) Field of Classification Search ................ 524/507, 524/522, 523; 525/125, 194, 221, 222, 330.2
See application file for complete search history.

(56) References Cited

U.S. PATENT DOCUMENTS 5,856,014 A  *  1/1999  Imashiro et al. ......... 428/425.8
6,599,980 B1      7/2003  Kim et al.
6,624,234 B1      9/2003  Itakura et al.

FOREIGN PATENT DOCUMENTS

EP   0 774 500 A1   5/1997
JP   5-287229 A     11/1993
JP   05287229 A  *  11/1993
JP   9-235508 A     9/1997
JP   2000-313825 A  11/2000
JP   2003-53907 A   2/2003
JP   2003-171486 A  6/2003
WO   WO 93/03104 A1 2/1993

* cited by examiner

Primary Examiner—Kelechi C. Egwim

(57) ABSTRACT

An object of the present invention is to easily provide an aqueous paint composition which is excellent in the low-temperature curability and can give a coated film that, while retaining a suitable texturability, further combines the water resistance, the marring resistance and the beef tallow staining resistance with good balance. In addition, another object of the present invention is to provide a coated article which is coated with this aqueous paint composition. As a means of achieving these objects, the aqueous paint composition according to the present invention is an aqueous paint composition comprising a water-soluble pure acrylic resin (A) as a binder resin and a polycarbodiimide compound (D) as a crosslinking agent; with the aqueous paint composition being characterized by further comprising acrylic resin beads (E) and urethane resin beads (F), wherein: in terms of solid component, the ratio of the water-soluble pure acrylic resin (A) relative to the binder resin, the ratios of the acrylic resin beads (E) and of the urethane resin beads (F) relative to the total of the binder resin and the crosslinking agent, and the equivalent ratio of the carbodiimide groups of the polycarbodiimide compound (D) relative to the carboxyl groups of the water-soluble pure acrylic resin (A) satisfy their respective specific ranges.

6 Claims, No Drawings

AQUEOUS PAINT COMPOSITION AND USES THEREOF

BACKGROUND OF THE INVENTION

A. Technical Field

The present invention relates to an aqueous paint composition and uses thereof, wherein the aqueous paint composition can be used for surface treatment of such as various plastic materials.

B. Background Art

Various plastic materials such as polypropylene, polyethylene, acrylonitrile-butadiene-styrene (ABS), polyurethane, polyphenylene oxide, polycarbonate and poly(vinyl chloride) are used in various utilities such as automobile interior parts and audio-visual equipment parts.

When desired properties such as chemical resistance, beef tallow staining resistance, alkali resistance and adhesion are imparted to the surfaces of these plastic materials, coating is generally performed using a paint composition which contains a binder resin, a pigment, an additive and the like as necessary and can exert the above properties.

As such a paint composition, in recent years, an aqueous paint composition containing an aqueous solvent such as water as a solvent is becoming used because regulations on the use of organic solvents are becoming strict worldwide from the viewpoint of such as prevention of natural environmental pollution, deterioration of work environment and prevention of fire occurrence.

Hitherto, as aqueous paint compositions, there have been proposed aqueous paint compositions in which such as pigments and additives, capable of exerting desired properties, are contained, as necessary, in resin emulsions (e.g.: carboxyl-group-containing resin emulsions such as acrylic resins, alkyd resins and polyesters; and chlorinated polyolefin resin emulsions such as maleic-acid-modified chlorinated polypropylene resin emulsions) (e.g. WO/93/03104, EP0774500A1, U.S. Pat. No. 6,624,234B1, U.S. Pat. No. 6,599,980B2, etc.).

Since the aforementioned prior aqueous paint compositions are poor in low-temperature curability and get cured at high temperatures, there is a possibility that substrates may be damaged. In addition, the resulting coated films are not only insufficient in water resistance, marring resistance and beef tallow staining resistance, but also have no suitable texturability (hereinafter, simply referred to as "texturability" in some cases), and don't combine them with good balance.

SUMMARY OF THE INVENTION

A. Objects of the Invention

Accordingly, an object of the present invention is to provide an aqueous paint composition which is excellent in the low-temperature curability and can give a coated film that, while retaining a suitable texturability, further combines the water resistance, the marring resistance and the beef tallow staining resistance with good balance. In addition, another object of the present invention is to provide a coated article which is coated with this aqueous paint composition.

B. Disclosure of the Invention

In order to attain the aforementioned objects, the present inventors diligently studied. As a result, the present inventors have completed the present invention by finding out and confirming that the aforementioned objects of the present invention can be attained all at once if a binder resin is used together with a crosslinking agent to thus introduce a crosslinked structure into a coated film, wherein: a water-soluble pure acrylic resin is adopted as the binder resin, and a polycarbodiimide compound is adopted as the crosslinking agent, and the content of the water soluble pure acrylic resin in the binder resin and the equivalent ratio between respective functional groups of the water-soluble pure acrylic resin and the polycarbodiimide compound are set so as to be in specific ranges, and further, specific two kinds of resin beads (acrylic resin beads and urethane resin beads) are added, and the mixing ratio between these resin beads is set so as to be in a specific range.

If the urethane resin beads are used jointly with the acrylic resin beads as the resin beads in the above way, then the formation of a coated film combining all properties of the texturability, the water resistance, the marring resistance and the beef tallow staining resistance sufficiently and with good balance can be unexpectedly easily realized (the formation of such a coated film has hitherto been difficult), and very high practicability and usefulness can be exerted in the field of utility which comes into contact with human hands.

Accordingly, an aqueous paint composition according to the present invention is an aqueous paint composition comprising a water-soluble pure acrylic resin (A) as a binder resin and a polycarbodiimide compound (D) as a crosslinking agent; with the aqueous paint composition being characterized by further comprising acrylic resin beads (E) and urethane resin beads (F), wherein: in terms of solid component, the ratio of the water-soluble pure acrylic resin (A) relative to 100 parts by weight of the binder resin is in the range of 17 to 30 parts by weight, and the ratios of the acrylic resin beads (E) and of the urethane resin beads (F) relative to 100 parts by weight of the total of the binder resin and the crosslinking agent are in the range of 52 to 98 parts by weight and in the range of 10 to 42 parts by weight respectively; and the equivalent ratio of the carbodiimide groups of the polycarbodiimide compound (D) relative to the carboxyl groups of the water-soluble pure acrylic resin (A) is in the range of 0.1 to 1.

As to the above aqueous paint composition according to the present invention:

it is possible that: the particle diameter compression rate of the acrylic resin beads (E) is 30% or larger; the particle diameter recovery rate of the acrylic resin beads (E) is 15% or larger; and the particle diameter compression rate of the urethane resin beads (F) is 45% or larger;

it is possible that the acid value of the water-soluble pure acrylic resin (A) is 100 KOHmg/g or larger;

it is possible that: the binder resin contains an emulsion-type acrylic resin (B);

and, in terms of solid component, the ratio of the emulsion-type acrylic resin (B) relative to 100 parts by weight of the binder resin is in the range of 35 to 48 parts by weight; and it is possible that: the binder resin contains an emulsion-type maleic-acid-modified chlorinated polypropylene resin (C); and, in terms of solid component, the ratio of the emulsion-type maleic-acid-modified chlorinated polypropylene resin (C) relative to 100 parts by weight of the binder resin is in the range of 29 to 42 parts by weight.

A coated article according to the present invention is coated with the above aqueous paint composition according to the present invention.

C. Effects of the Invention

The present invention can easily provide an aqueous paint composition which is excellent in the low-temperature curability and can give a coated film that, while retaining a suitable texturability, further combines the water resistance, the marring resistance and the beef tallow staining resistance with good balance. In addition, the present invention can provide a coated article which is coated with this aqueous paint composition.

These and other objects and the advantages of the present invention will be more fully apparent from the following detailed disclosure.

DETAILED DESCRIPTION OF THE INVENTION

Hereinafter, detailed descriptions are given about the present invention. However, the scope of the present invention is not bound to these descriptions. And other than the following illustrations can also be carried out in the form of appropriate modifications of the following illustrations within the scope not departing from the spirit of the present invention.

[Aqueous Paint Composition]:

The aqueous paint composition according to the present invention is, as aforementioned, an aqueous paint composition comprising a water-soluble pure acrylic resin (A) as a binder resin and a polycarbodiimide compound (D) as a crosslinking agent and further comprising acrylic resin beads (E) and urethane resin beads (F).

Hereinafter, descriptions are given first about each component of the aqueous paint composition in detail and subsequently about the aqueous paint composition.

(Binder Resin):

In the present invention, it is important that the binder resin contains the water-soluble pure acrylic resin (A) as an essential component in the below-mentioned specific content. If the water-soluble pure acrylic resin (A) is contained as an essential component and used in combination with the below-mentioned polycarbodiimide compound (D), then the low-temperature curability is excellent, and further, such as strength, staining resistance (e.g. beef tallow staining resistance), alkali resistance, solvent resistance and weather resistance of a coated film obtained from the aqueous paint composition can be enhanced. Thus, the aforementioned object of the present invention can be easily attained.

The water-soluble pure acrylic resin (A) is a water-soluble resin containing no constitutional unit derived from styrene and is obtained by homopolymerizing or copolymerizing an acrylic monomer such as (meth)acrylic acids, (meth)acrylic acid esters and (meth)acrylonitriles. When the constitutional unit derived from styrene is contained, there is a possibility that the solvent resistance and beef tallow staining resistance of the resulting coated film may be deteriorated.

When attention is paid to the functional group to be contained, examples of the aforementioned acrylic monomer include an acrylic monomer having a carboxyl group, an acrylic monomer having a hydroxyl group and an acrylic monomer having an ester group. The aforementioned various acrylic monomers may be used either alone respectively or in combinations with each other without limitation.

The acrylic monomer having a carboxyl group is not limited. However, examples thereof include acrylic acid and methacrylic acid. These may be used either alone respectively or in combinations with each other without limitation.

The acrylic monomer having a hydroxyl group is not limited. However, examples thereof include 2-hydroxyethyl (meth)acrylate, 3-hydroxypropyl (meth)acrylate, 4-hydroxybutyl (meth)acrylate, and ε-caprolactone addition products from 2-hydroxyethyl (meth)acrylate. These may be used either alone respectively or in combinations with each other without limitation.

The acrylic monomer having an ester group is not limited. However, examples thereof include methyl (meth)acrylate, ethyl (meth)acrylate, butyl (meth)acrylate, isobutyl (meth) acrylate, tertiary-butyl (meth)acrylate, 2-ethylhexyl (meth) acrylate, and isobornyl (meth)acrylate. These may be used either alone respectively or in combinations with each other without limitation.

The water-soluble pure acrylic resin (A) has an acid value (solid component acid value) of favorably 100 KOHmg/g or larger, more favorably 110 to 250 KOHmg/g, still more favorably 150 to 220 KOHmg/g. When the acid value is smaller than 100 KOHmg/g, there is a possibility that: the low-temperature curability may be deteriorated, and besides, the strength and beef tallow staining resistance of the resulting coated film may be deteriorated. On the other hand, when the acid value is too high, there is a possibility that: the storage stability may be deteriorated, and besides, the water resistance of the resulting coated film may be deteriorated. In order for the acid value of the water-soluble pure acrylic resin (A) to satisfy the aforementioned range, it will do to appropriately adjust the amount of the monomer containing an acid group such as carboxyl group being used.

Although not limited, the glass transition temperature (Tg (° C.)) of the water-soluble pure acrylic resin (A) is favorably 50° C. or higher, more favorably 60° C. or higher. When the above Tg is lower than 50° C., there is a possibility that the beef tallow staining resistance of the resulting coated film may be deteriorated. Incidentally, herein, the glass transition temperature (Tg (° C.)) of a resin is a value calculated from the Tg of a homopolymer of each monomer being used and from the mixing ratio (% by weight) of each monomer relative to the entire monomer components being used.

Although not limited, the weight-average molecular weight (Mw) of the water-soluble pure acrylic resin (A) is favorably in the range of 4,000 to 50,000, more favorably 5,000 to 40,000. When the above Mw is smaller than 4,000, there is a possibility that the beef tallow staining resistance of the resulting coated film may be deteriorated. When the above Mw exceeds 50,000, there is a possibility that the storage stability may be deteriorated.

It is important that the content of the water-soluble pure acrylic resin (A) is in the range of 17 to 30 parts by weight, favorably 20 to 25 parts by weight, relative to 100 parts by weight of the binder resin in terms of solid component. When the above content is lower than 17 parts by weight, there is a possibility that: the low-temperature curability may be deteriorated, and besides, the strength and beef tallow staining resistance of the resulting coated film may be deteriorated. When the above content exceeds 30 parts by weight, there is a possibility that the storage stability may be deteriorated.

In the present invention, besides the water-soluble pure acrylic resin (A), other resins can be used as the aforementioned binder resin in such a range that the effects of the present invention are not deteriorated. Although not limited, examples of the above other resins include various emulsion-type resins such as an emulsion-type acrylic resin (B), an emulsion-type maleic-acid-modified chlorinated polypropylene resin (C), an emulsion-type polyester resin, an emulsion-type polyurethane resin, an emulsion-type epoxy resin and an emulsion-type amino resin. Above all, the above emulsion-type acrylic resin (B) is used favorably in that such as strength, weather resistance, staining resistance (e.g. beef tallow staining resistance), alkali resistance, and solvent resistance of the resulting coated film can be enhanced. In addition, the above emulsion-type maleic-acid-modified chlorinated polypropylene resin (C) is used favorably in that such as adhesion to substrates to be coated (in particular, polyolefin substrates (materials such as polypropylene)) can be enhanced. These other resins may be used either alone respectively or in combinations with each other without limitation.

The emulsion-type acrylic resin (B) is favorably a pure acrylic resin, and at least a part of the pure acrylic resin may be modified with the below-mentioned chlorinated polypropylene resin. Regarding the pure acrylic resin as hereupon referred to and the modified resin as mentioned above, thereto there can be applied the same descriptions as aforementioned about the water-soluble pure acrylic resin (A).

Although not limited, the glass transition temperature (Tg (° C.)) of the emulsion-type acrylic resin (B) is favorably 40° C. or higher, more favorably 50° C. or higher. When the above Tg is lower than 40° C., there is a possibility that the beef tallow staining resistance of the resulting coated film may be deteriorated.

The emulsion-type acrylic resin (B) is obtained by a process including the steps of: synthesizing an acrylic resin by hitherto publicly known methods in advance; and then emulsifying this acrylic resin in the below-mentioned way.

The content of the emulsion-type acrylic resin (B) is favorably in the range of 35 to 48 parts by weight, more favorably 40 to 45 parts by weight, relative to 100 parts by weight of the binder resin in terms of solid component. When the above content is lower than 35 parts by weight, there is a possibility that: the strength, weather resistance, staining resistance (e.g. beef tallow staining resistance), alkali resistance, and solvent resistance of the resulting coated film may be deteriorated. When the above content exceeds 48 parts by weight, there is a possibility that the adhesion of the resulting coated film to polyolefin substrates such as polypropylene may be deteriorated.

The emulsion-type maleic-acid-modified chlorinated polypropylene resin (C) is a polypropylene derivative containing a chlorinated polypropylene moiety (c1) and an maleic anhydride moiety (c2) as essential constitutional moieties. The chlorinated polypropylene moiety (c1) refers to a moiety derived from polypropylene such that at least a part of hydrogen atoms of polypropylene are displaced with a chlorine atom. The maleic anhydride moiety (c2) is a moiety derived from maleic anhydride, which moiety graft-bonds to the above chlorinated polypropylene moiety (c1) to thus modify this chlorinated polypropylene moiety (c1).

Although not limited, the chlorine content (chlorine atom content) in the emulsion-type maleic-acid-modified chlorinated polypropylene resin (C) is favorably in the range of 15 to 25% by weight relative to the entirety of the above resin (C). When the above chlorine content is lower than 15% by weight, there is a possibility that the emulsification may be difficult, thus resulting in failure to obtain the emulsion of the maleic-acid-modified chlorinated polypropylene resin (C). When the above chlorine content exceeds 25% by weight, there is a possibility that: the adhesion of the resulting coated film to polyolefin substrates such as polypropylene may be deteriorated, and besides, the beef tallow staining resistance of the resulting coated film may be deteriorated.

Although not limited, the content of the maleic anhydride moiety (c2) in the emulsion-type maleic-acid-modified chlorinated polypropylene resin (C) is favorably in the range of 1 to 5% by weight relative to the entirety of the above resin (C). When the above content is lower than 1% by weight, there is a possibility that the emulsification may be difficult, thus resulting in failure to obtain the emulsion of the maleic-acid-modified chlorinated polypropylene resin (C). When the above content exceeds 5% by weight, there is a possibility that the adhesion of the resulting coated film to polyolefin substrates such as polypropylene may be deteriorated.

Although not limited, the weight-average molecular weight (Mw) of the emulsion-type maleic-acid-modified chlorinated polypropylene resin (C) is favorably in the range of 30,000 to 100,000. When the above Mw is smaller than 30,000, there is a possibility that the beef tallow staining resistance of the resulting coated film may be deteriorated. When the above Mw exceeds 100,000, there is a possibility that the emulsification may be difficult, thus resulting in failure to obtain the emulsion of the maleic-acid-modified chlorinated polypropylene resin (C).

The emulsion-type maleic-acid-modified chlorinated polypropylene resin (C) is obtained by a process including the steps of: first, preparing a maleic-acid-modified chlorinated polypropylene resin; and then emulsifying this resin in the below-mentioned way.

The maleic-acid-modified chlorinated polypropylene resin can be obtained by causing a polypropylene (which has been synthesized by hitherto publicly known methods in advance) to react with maleic anhydride and chlorine to thus internally modify the polypropylene. Hereupon, either of chlorine and maleic anhydride may be caused to react with polypropylene prior to the other. The reaction with chlorine is, for example, favorably performed by introducing a chlorine gas into a solution containing the polypropylene (or maleic-anhydride-modified polypropylene). The reaction with maleic anhydride is, for example, favorably performed by causing the polypropylene (or chlorinated polypropylene) to react with maleic anhydride in the presence of a peroxide.

The content of the emulsion-type maleic-acid-modified chlorinated polypropylene resin (C) is favorably in the range of 29 to 42 parts by weight, more favorably 30 to 35 parts by weight, relative to 100 parts by weight of the binder resin in terms of solid component. When the above content is lower than 29 parts by weight, there is a possibility that the adhesion of the resulting coated film to polyolefin substrates such as polypropylene may be deteriorated. When the above content exceeds 42 parts by weight, there is a possibility that the staining resistance (e.g. beef tallow staining resistance) of the resulting coated film may be deteriorated.

The aforementioned various emulsion-type resins are resins which are in the form of particles dispersed in an aqueous solvent. As necessary, such as an emulsifying agent, a surfactant and a dispersant are used in order that this dispersed state can stably be retained. In particular, the acrylic resin and the chlorinated polypropylene resin have such high hydrophobicity as to be difficult to stably and uniformly disperse into the aqueous solvent. Therefore, these resins are favorably emulsified with the emulsifying agent or a basic substance as a neutralizing agent (pH-adjusting agent). Incidentally, as to methods for emulsifying these resins, hitherto publicly known techniques and conditions can be appropriately selected and adopted except for the below-described points, thus there being no limitation.

When the emulsifying agent is used, its amount being used may be set appropriately for the kinds and amounts of such as the resin (to be emulsified), the basic substance and the aqueous solvent, thus there being no limitation. However, for example, in the case of the chlorinated polypropylene resin, the emulsifying agent is favorably used in the range of 3 to 40 parts by weight, more favorably 10 to 25 parts by weight, relative to 100 parts by weight of the resin. In the case of the acrylic resin, the emulsifying agent is favorably used in the range of 3 to 40 parts by weight, more favorably 10 to 20 parts by weight, relative to 100 parts by weight of the resin. When the amount of the emulsifying agent being used is below the aforementioned range, there is a possibility that: the flocculation or sedimentation of the resin may tend to occur on the way of the emulsification or polymerization, and besides, the storage stability of the aqueous paint composition may be deteriorated. When the amount of the emulsifying agent being used is above the aforementioned range, there is a possibility that the emulsifying agent which is not present on surfaces of resin particles may result in being contained in the resulting coated film in such a large amount as to deteriorate the water resistance and weather resistance of the coated film.

The emulsifying agent is not limited. However, examples thereof include: non-reactive emulsifying agents such as nonionic emulsifying agents (e.g. polyoxyethylene alkyl ethers, polyoxyethylene alkyl phenol ethers, polyoxyethylene aliphatic esters, polyoxyethylene polyhydric alcohol fatty acid esters, polyhydric alcohol fatty acid esters, polyoxyethylene propylene polyols and alkylolamides); anionic emulsifying agents (e.g. alkyl sulfate ester salts, alkyl phenol sulfonic acid salts and sulfosuccinic acid ester salts); amphoteric emulsifying agents (e.g. alkylbetaines and alkylimidazolines); resin-type emulsifying agents (e.g. polyoxyethylene-group-containing urethane resins and carboxylate-group-containing urethane resins); cationic emulsifying agents (e.g. imidazoline laurate, lauryltrimethylammonium chloride, stearylbetaine and distearyldimethylammonium chloride). Above all, the nonionic emulsifying agents are favorable since they have no ionic polar group having high hydrophilicity and therefore provide the resulting coated film with excellent water resistance. These emulsifying agents may be used either alone respectively or in combinations with each other.

As the emulsifying agent, a reactive emulsifying agent may be used besides the above non-reactive emulsifying agent. When the reactive emulsifying agent is used jointly with the non-reactive emulsifying agent, the water resistance of the resulting coated film can be enhanced. The reactive emulsifying agent is an emulsifying agent having a reactive group (e.g. a radically polymerizable unsaturated bonding group) besides a hydrophilic group (e.g. poly(ethylene oxide) group, hydroxyl group, carboxyl group, sulfonic acid group, sulfuric acid group and amino group) and a hydrophobic group (e.g. alkyl group, phenyl group, fluoroalkyl group and polysiloxane group).

The reactive emulsifying agent is not limited. However, examples thereof include: emulsifying agents having an allyl ether group, a poly(ethylene oxide) group and a nonylphenyl group (e.g. trade names: ADECALIASOAP NE-10, NE-20 and NE-30, produced by ASAHI DENKA CO., LTD.), emulsifying agents having an allyl ether group, a poly(ethylene oxide) group, a sulfuric acid group and a nonylphenyl group (e.g. trade name: SE-10N, produced by ASAHI DENKA CO., LTD.), emulsifying agents having a propenyl group in a phenyl group in a polyoxyethylene nonylphenyl ether group (e.g. trade names: AQUALON RN-20, RN-30 and RN-50, produced by DAI-ICHI KOGYO SEIYAKU CO., LTD.), emulsifying agents having a propenyl group in a phenyl group in a polyoxyethylene nonylphenyl ether sulfuric acid ester group (e.g. trade names: HS-10 and HS-20, produced by DAI-ICHI KOGYO SEIYAKU CO., LTD.), emulsifying agents having an allyl group and a sulfonic acid group (e.g. trade names: S-120A and S-180A, produced by KAO CORPORATION), and emulsifying agents having a methacryloyl group or an acryloyl group (e.g. bis(polyoxyethylene polycyclic phenyl ether)-methacrylated sulfuric acid ester salts (e.g. trade name: Antox MS-60, produced by NIPPON NYUKAZAI CO., LTD.), polyoxyethylene nonylphenyl ether acrylic acid esters (e.g. trade names: RMA-564, RMA-568, and RMA-506, produced by NIPPON NYUKAZAI CO., LTD.), polyoxyethylene alkyl ether methacrylic acid esters (e.g. trade names: RMA-1120 and MPG130-MA, produced by NIPPON NYUKAZAI CO., LTD.), polyoxyethylene methacrylic acid esters (e.g. trade names: MA-30, MA-50, and MA-100, produced by NIPPON NYUKAZAI CO., LTD.)). These may be used either alone respectively or in combinations with each other.

The basic substance as the neutralizing agent (pH-adjusting agent) functions to enhance the hydrophilicity of the resin (to be emulsified) to thus enhance the storage stability of the resulting resin emulsion, by adding to and/or neutralizing an acidic functional group possessed by such as the resin (to be emulsified) or the emulsifying agent (e.g. carboxyl group of the maleic anhydride moiety of the chlorinated polypropylene resin).

When the above basic substance is used, its amount being used may be set appropriately for the kinds and amounts of such as the resin (to be emulsified), the emulsifying agent and the aqueous solvent and with consideration given to sufficient neutralization of the acidic functional group possessed by such as the resin (to be emulsified) or the emulsifying agent, thus there being no limitation. However, for example, the basic substance is favorably used in the range of 0.1 to 5% by weight relative to the entire resin emulsion. When the above amount being used is smaller than 0.1% by weight, there is a possibility that: the flocculation or sedimentation of the resin may tend to occur during the emulsification, and besides, the storage stability of the aqueous paint composition may be deteriorated. When the above amount being used exceeds 5% by weight, there is a possibility that the water resistance and weather resistance of the coated film may be deteriorated.

Although not limited, the pH of the resin emulsion, which is adjusted by using the above basic substance as necessary, is favorably in the range of 7 to 11, more favorably 7.5 to 10.5, still more favorably 8 to 10. When the above pH is lower than 7, there is a possibility that: the neutralization may be so insufficient that the storage stability of the resin emulsion and further the storage stability of the aqueous paint composition is deteriorated. When the above pH is higher than 11, there is a possibility that a free basic substance is present so excessively in the resin emulsion as to emit a strong amine odor to thus make the use difficult.

Although not limited, examples of the above basic substance include an amine compound and/or ammonia. Examples of the amine compound include: monoamines such as trimethylamine, triethylamine, butylamine, dibutylamine and N-methylmorpholine; polyamines such as ethylenediamine, hexamethylenediamine, piperazine, isophoronediamine, triethylenediamine and diethylenetriamine; and alkanolamines such as monoethanolamine, diethanolamine, triethanolamine, N-methyldiethanolamine, N,N-dimethylethanolamine and 2-amino-2-methylpropanol. These may be used either alone respectively or in combinations with each other.

Favorable as the aqueous solvent are such as water and a mixed solvent of water and a hydrophilic organic solvent (e.g. methanol, ethanol). In the case of the mixed solvent, the mixing ratio of the hydrophilic organic solvent is favorably 30% by weight or smaller, more favorably 10% by weight or smaller, relative to the entirety of the mixed solvent.

The mixing ratio of the aqueous solvent is favorably in the range of 50 to 95% by weight, more favorably 50 to 85% by weight, still more favorably 55 to 80% by weight, relative to the entire resin emulsion. When the above mixing ratio is smaller than 50% by weight, there is a possibility that the nonvolatile solid component content in the resin emulsion may be too high, and therefore such as the flocculation of the resin may tend to occur, and therefore the storage stability of the resin emulsion and further the storage stability of the aqueous paint composition may be deteriorated. When the above mixing ratio exceeds 95% by weight, there is a possibility that: the workability in the preparation of the resin emulsion may be deteriorated, and besides, such as deterioration of the productivity may impose restrictions on the production of the aqueous paint composition.

Although not limited, the particle diameter of the resin particle in the resulting resin emulsion (emulsion-type resin such as the aforementioned resin (B) or (C)) is favorably in the range of 0.01 to 10 μm, more favorably 0.03 to 5 μm, still more favorably 0.05 to 1 μm. When the above particle diameter is smaller than 0.01 μm, there is a possibility that the emulsifying agent may be necessary in such a large amount as to deteriorate the water resistance and weather resistance of the resulting coated film. When the above particle diameter exceeds 10 μm, there is a possibility that: the storage stability of the resin emulsion may be deteriorated, and further the volume of the resin particle may be large so excessively as to need a large quantity of melting heat and much time for the formation of the coated film and as to deteriorate the thermal flowability, thus resulting in the deteriorations of such as the appearance (smoothness), water resistance and solvent resistance of the resulting coated film.

As to the resin emulsion containing the emulsion-type acrylic resin (B), favorable examples of its commercially available products include:

Neocryl A-6015 (trade name) produced by NeoResins Inc. (solid component content: 45% by weight, resin particle diameter: 0.3 μm≧, Tg: 63° C.);

RA86343 (trade name) produced by ROHM & HAAS COMPANY (solid component content: 40% by weight, resin particle diameter: 0.3 μm ≧=, Tg: 83° C.); and RA86401 (trade name) produced by ROHM & HAAS COMPANY (solid component content: 40% by weight, resin particle diameter: 0.3 μm≧, Tg: 83° C.). These may be used either alone respectively or in combinations with each other.

As to the resin emulsion containing the emulsion-type maleic-acid-modified chlorinated polypropylene resin (C), favorable examples of its commercially available products include:

Hardren EW5003 (trade name) produced by Toyo Kasei Kogyo Co., Ltd. (solid component content: 30% by weight, resin particle diameter: 0.3 μm≧, Mw: 80,000, maleic anhydride moiety content: 1.6% by weigh, chlorine content: 16% by weight);

IN70170 (trade name) produced by ROHM & HAAS COMPANY (solid component content: 30% by weight, resin particle diameter: 0.3 μm≧, Mw: 60,000, maleic anhydride moiety content: 3.5% by weight, chlorine content: 20% by weight); and Superchlon S4100 (trade name) produced by Nippon Paper Chemicals Co., Ltd. (solid component content: 30% by weight, resin particle diameter: 1.0 μm≧, Mw: 50,000, maleic anhydride moiety content: 4.0% by weight, chlorine content: 18.2% by weight). These may be used either alone respectively or in combinations with each other.

(Crosslinking Agent):

In the present invention, it is important that the crosslinking agent contains the polycarbodiimide compound (D) as an essential component in the below-mentioned specific equivalent ratio. If the polycarbodiimide compound (D) is contained as an essential component and used in combination with the aforementioned water-soluble pure acrylic resin (A), then such as the low-temperature curability of the aqueous paint composition and the strength and staining resistance (e.g. beef tallow staining resistance) of a coated film obtained from the aqueous paint composition can be enhanced. Thus, the aforementioned object of the present invention can be easily attained.

The polycarbodiimide compound (D) will do if it is a hitherto publicly known carbodiimide-group-containing compound having at least two carbodiimide groups in one molecule. Thus, there is no limitation thereon. However, examples of its commercially available products include: Carbodirite E-01 (trade name) produced by Nisshinbo K. K.; Carbodirite E-02 (trade name) produced by Nisshinbo K. K.; Carbodirite E-03A (trade name) produced by Nisshinbo K. K.; and XL29SE (trade name) produced by Union Carbide Corp. Above all, the above Carbodirite E-03A is favorable in that a coated film having excellent weather resistance is obtained. These may be used either alone respectively or in combinations with each other.

As to the amount of the polycarbodiimide compound (D) being used, it is important that the equivalent ratio of the carbodiimide groups of the polycarbodiimide compound (D) relative to the carboxyl groups of the water-soluble pure acrylic resin (A) as the binder resin is set so as to be in the range of 0.1 to 1, favorably 0.3 to 0.9. When the above equivalent ratio is smaller than 0.1, there is a possibility that: the low-temperature curability may be deteriorated, and besides, the strength of the resulting coated film may be deteriorated. When the above equivalent ratio exceeds 1, there is a possibility that the storage stability may be deteriorated, and besides, the water resistance and beef tallow staining resistance of the resulting coated film may be deteriorated.

The aforementioned crosslinking agent may contain other crosslinking agents besides the polycarbodiimide compound (D) in such a range that the effects of the present invention are not deteriorated.

Although not limited, examples of the above other crosslinking agents include amino resin emulsions and epoxy resin emulsions. These may be used either alone respectively or in combinations with each other.

(Resin Beads):

As to the composition according to the present invention, it is important that this composition contains the acrylic resin beads (E) and the urethane resin beads (F) both as essential components in the below-mentioned specific contents. If the acrylic resin beads (E) and the urethane resin beads (F) are used in combination with each other, then it follows that a coated film obtained from the aqueous paint composition is a coated film that combines the water resistance, the marring resistance and the beef tallow staining resistance besides the texturability with good balance. Thus, the aforementioned object of the present invention can be easily attained.

The acrylic resin beads (E) are resin particles including an acrylic resin. This acrylic resin is not limited. Hitherto publicly known acrylic resins can be appropriately adopted.

However, the pure acrylic resins as recited in the description about the water-soluble pure acrylic resin (A) can be favorably applied. By using the acrylic resin beads (E), the water resistance as well as the texturability can be imparted to the resulting coated film, and it also becomes easy to make the surface of the coated film matte.

The urethane resin beads (F) are resin particles including a urethane resin. This urethane resin is not limited. Hitherto publicly known urethane resins can be appropriately adopted. By using the urethane resin beads (F), the marring resistance and beef tallow staining resistance as well as the texturability can be imparted to the resulting coated film, and it also becomes easy to make the surface of the coated film matte.

Incidentally, any of the acrylic resin beads (E) and the urethane resin beads (F) may be crosslinked-type resin beads which have been internally crosslinked.

It is important that the content of the acrylic resin beads (E) is in the range of 52 to 98 parts by weight, favorably 60 to 80 parts by weight, relative to 100 parts by weight of the total of the binder resin and the crosslinking agent in terms of solid component. When the above content is lower than 52 parts by weight, there is a possibility that the texturability, making matte, and water resistance of the resulting coated film may be deteriorated. When the above content exceeds 98 parts by weight, there is a possibility that: a rough skin may occur to the resulting coated film, and further its marring resistance and beef tallow staining resistance may be deteriorated.

It is important that the content of the urethane resin beads (F) is in the range of 10 to 42 parts by weight, favorably 15 to 30 parts by weight, relative to 100 parts by weight of the total of the binder resin and the crosslinking agent in terms of solid component. When the above content is lower than 10 parts by weight, there is a possibility that the texturability, making matte, marring resistance and beef tallow staining resistance may not sufficiently be imparted to the resulting coated film. When the above content exceeds 42 parts by weight, there is a possibility that: a rough skin may occur to the resulting coated film, and further its water resistance may be deteriorated.

As to the acrylic resin beads (E), it is favorable that its particle diameter compression rate and particle diameter recovery rate both satisfy their respective specific ranges. Specifically, the above particle diameter compression rate is favorably 30% or larger, more favorably in the range of 30 to 45%, still more favorably 35 to 45%, and further, the above particle diameter recovery rate is favorably 15% or larger, more favorably 20% or larger. When the above particle diameter compression rate is smaller than 30%, there is a possibility that the marring resistance of the resulting coated film may be deteriorated. When the above particle diameter compression rate is too high, there is a possibility that the strength of the resulting coated film may be deteriorated. In addition, when the above particle diameter recovery rate is smaller than 15%, there is a possibility that the marring resistance of the resulting coated film may be deteriorated.

As to the urethane resin beads (F), it is favorable that its particle diameter compression rate satisfies the specific range. Specifically, the above particle diameter compression rate is favorably 45% or larger, more favorably in the range of 45 to 65%, still more favorably 45 to 60%. When the above particle diameter compression rate is smaller than 45%, there is a possibility that the marring resistance of the resulting coated film may be deteriorated. When the above particle diameter compression rate is too high, there is a possibility that the strength of the resulting coated film may be deteriorated. Although not limited, the particle diameter recovery rate of the urethane resin beads (F) is, for example, favorably 5% or larger.

Incidentally, the above particle diameter compression rate and particle diameter recovery rate are defined as values determined by the methods described in the below-mentioned detailed description of the preferred embodiments.

Although not limited, the average particle diameters of the acrylic resin beads (E) and of the urethane resin beads (F) are both favorably in the range of 0.5 to 20 µm, more favorably 1 to 15 µm. When the above average particle diameters are smaller than 0.5 µm, there is a possibility that: it may be difficult to obtain a suitable texturability or to make matte, and besides, the viscosity of the paint may rise to increase the dilution ratio of the paint in the coating step and therefore decrease the nonvolatile component content of the paint, thus resulting in the deterioration of the coating efficiency. When the above average particle diameters exceed 20 µm, there is a possibility that the marring resistance of the surface of the resulting coated film may be deteriorated.

As to the acrylic resin beads (E), favorable examples of its commercially available products include: Techpolymer BM30X-8 (trade name) produced by SEKISUI PLASTICS CO., LTD.; Techpolymer BM30X-12 (trade name) produced by SEKISUI PLASTICS CO., LTD.; Art Pearl G800T (trade name) produced by Negami Chemical Industrial Co., Ltd.; and Art Pearl G400T (trade name) produced by Negami Chemical Industrial Co., Ltd. Above all, Techpolymer BM30X-8 and Art Pearl G800T are more favorable. These may be used either alone respectively or in combinations with each other.

As to the urethane resin beads (F), favorable examples of its commercially available products include: Art Pearl U-600T (trade name) produced by Negami Chemical Industrial Co., Ltd.; and Art Pearl P800T (trade name) produced by Negami Chemical Industrial Co., Ltd. Above all, Art Pearl U-600T is more favorable. These may be used either alone respectively or in combinations with each other.

As necessary, the composition according to the present invention can contain other resin beads besides the acrylic resin beads (E) and the urethane resin beads (F) in such a range that the effects of the present invention are not deteriorated.

(Other Constitutional Components):

As necessary, the composition according to the present invention can contain various additives, which are commonly used in the paint field, besides the aforementioned various constitutional components in such a range that the effects of the present invention are not deteriorated. Examples thereof include: colorants; extenders (e.g. talc); pigments imparting the sparkle effect (e.g. aluminum flakes, mica powders); additives (e.g. surfactants, neutralizing agents, stabilizing agents, thickeners, defoaming agents, surface conditioners, ultraviolet absorbing agents, antioxidants); inorganic fillers (e.g. silica); conductive fillers (e.g. conductive carbon, conductive fillers, metal powders); and assistant additives (e.g. organic modifiers, plasticizers).

Although not limited, examples of the above colorants include: inorganic pigments (e.g. titanium oxide, carbon black, iron oxide, chromium oxide, Prussian blue); organic pigments (e.g. azo pigments, anthracene pigments, perylene pigments, quinacridone pigments, indigo pigments, phthalocyanine pigments); and dyes.

The composition according to the present invention may contain an organic solvent if its amount is 30% by weight or smaller (favorably 20% by weight or smaller) relative to the entire composition. When the composition contains the organic solvent, the workability is improved, and the dispersibility of such as pigments is enhanced. Of course, generally, the freedom from the organic solvent is preferable in point of excellent storage stability and further of complying with recent years' regulations on the use of the organic solvent.

Although not limited, examples of the above organic solvent include: aromatic hydrocarbons (e.g. toluene and xylene); aliphatic hydrocarbons (e.g. hexane, heptane, and octane); alicyclic hydrocarbons (e.g. cyclohexane, methylcyclohexane and cyclopentane); esters (e.g. ethyl acetate, n-butyl acetate, isobutyl acetate and amyl acetate); ethers (e.g. n-butyl ether and isobutyl ether); ketones (e.g. acetone, methyl ethyl ketone, methyl isobutyl ketone and cyclohexanone); alcohols (e.g. methanol, ethanol, isopropanol, n-butanol, 2-butanol, n-propylene glycol and isopropylene glycol); cellosolves (e.g. ethylene glycol monomethyl ether, ethylene glycol monobutyl ether and ethylene glycol monoethyl ether acetate); carbitols (e.g. diethylene glycol monoethyl ether); propylene glycol monoalkyl ethers (e.g. propylene glycol monomethyl ether, propylene glycol monoethyl ether and propylene glycol monobutyl ether); and other solvents (e.g. dioxane, N-methylpyrrolidone, dimethylformamide and diacetone alcohol).

(Aqueous Paint Composition):

The composition according to the present invention is, as mentioned above, a paint composition comprising the water-soluble pure acrylic resin (A), the polycarbodiimide compound (D), the acrylic resin beads (E) and the urethane resin beads (F) as essential constitutional components. However, since being aqueous, this composition further comprises an aqueous solvent as an essential constitutional component. Favorable examples of the aqueous solvent include the same as the aforementioned aqueous solvents that can be used for preparing the emulsion-type resins.

The above aqueous solvent which is an essential constitutional component may be added alone to the composition according to the present invention. Or, when the aforementioned emulsion-type resin is used as the binder resin, the above aqueous solvent may be added, as one constitutional component of the resin emulsion together with this resin emulsion, to the composition according to the present invention. Thus, there is no limitation.

The mixing ratio of the aqueous solvent in the composition according to the present invention is not limited. It may be appropriately set in such a range that the constitutional components such as the binder resin can satisfy the desired mixing ratios.

The mixing ratio of the binder resin (solid components) in the composition according to the present invention is not limited. It may be appropriately set with consideration given to such as the kinds and utilities of the other components.

The composition according to the present invention may be a mixture of all the aforementioned constitutional components, or may be provided with at least one constitutional component independent of the other constitutional components. In particular, the composition may be a mixture of the aforementioned binder resin and the aforementioned crosslinking agent (so-called 1-package aqueous paint composition), or may be provided with the aforementioned binder resin and the aforementioned crosslinking agent separate from each other (so-called 2-package aqueous paint composition), thus there being no limitation. The process for preparing the 1-package aqueous paint composition is not limited. Publicly known mixing methods which can mix two or more substances can be adopted. The case of the 2-package composition will do if the constitutional components are mixed together by the same methods as those for preparing the 1-package composition and then used as a paint.

The composition according to the present invention may be a paint composition as a so-called final product to which components (e.g. pigment) commonly necessary for a paint have been added, or may be a paint composition as a so-called intermediate product to which the above components (e.g. pigment) have not been added yet. Thus, there is no limitation.

The composition according to the present invention is suitable as a paint which is used for coating of such as automobile interior parts (e.g. instrumental panels, center consoles, door trims) and audio-visual equipment parts (e.g. casings of such as radios, cassette tape recorders, CD players, and computers).

[Coated Article]:

The coated article according to the present invention is, as aforementioned, an article which is coated with the above aqueous paint composition according to the present invention, that is, an article which is provided at least with: a substrate as the object of the coating; and a coated film obtained from the aqueous paint composition according to the present invention and formed on the surface of the above substrate.

The substrate as the object of the coating is not limited. However, various plastic materials are favorable. Examples thereof include polyolefins (e.g. polypropylene (PP) and polyethylene (PE)), and besides, acrylonitrile-styrene (AS), acrylonitrile-butadiene-styrene (ABS), poly(phenylene oxide) (PPO), poly(vinyl chloride) (PVC), polyurethane (PU) and polycarbonate (PC).

As to the method of coating the aqueous paint composition onto the surface of the above substrate, either of an air spray method and an airless spray method will do, and thus there is no limitation.

In the aforementioned coating step, the composition is coated while adjusting the coated film thickness so that the thickness of the finally obtained coated film (cured film thickness) will be in the range of favorably 10 to 50 μm, more favorably 15 to 25 μm. When the coated film thickness is such that the cured film thickness will be smaller than 10 μm, there is a possibility that the thickness may be too small, thus resulting in failure to obtain a continuous uniform coated film. When the coated film thickness is such that the cured film thickness will exceed 50 μm, there is a possibility that: problems of such as cracks may occur to the resulting coated film, and besides, there may be economical disadvantages.

The coated article according to the present invention is obtained by heat-curing the coated film after the above coating step.

If the aqueous paint composition according to the present invention is used, then the temperature for curing the coated film subsequently to the coating step can be sufficiently lowered. That is to say, the crosslinked structure formed by the reaction between the binder resin and the crosslinking agent can be sufficiently introduced into the coated film at a lower temperature. Specifically, from the viewpoint of the improvements in the workability and the physical properties, the curing is performed by heating favorably in the range of 50 to 75° C. for 5 minutes, more favorably in the range of 55 to 70° C. for 5 minutes. When the above curing temperature is lower than 50° C., there is a possibility that the coated film cannot sufficiently be cured. When the above curing temperature is higher than 75° C., there is a possibility that: even if the temperature is more raised, the effects being obtained may be unchanged, thus there being economical disadvantages.

The coated article according to the present invention is such that the surface of the substrate is coated with the aqueous paint composition according to the present invention. Therefore, the resultant surface (coated film), while retaining a suitable texturability, further combines the water resistance, the marring resistance and the beef tallow staining resistance with good balance.

The coated article according to the present invention is suitable for such as automobile interior parts (e.g. instrumental panels, center consoles, door trims) and audio-visual equipment parts (e.g. casings of such as radios, cassette tape recorders, CD players, and computers).

DETAILED DESCRIPTION OF THE PREFERRED EMBODIMENTS

Hereinafter, the present invention is more specifically illustrated by the following Examples of some preferred embodiments in comparison with Comparative Examples not according to the present invention. However, the present invention is not limited to them. Hereinafter, for convenience, the unit "weight part(s)" may be referred to simply as "part(s)". In addition, the unit "weight %" may be referred to as "wt %".

Such as evaluation methods in the Examples and the Comparative Examples are shown below.

[Evaluations on Aqueous Paint Composition]:
<Storage Stability>:

The prepared aqueous paint composition (1-package state) was placed into a 300 mL glass container with a lid, and then this container was hermetically sealed and then placed into an electric furnace of 40° C. and then left there for 10 days. Ten days after, the above glass container was removed from the electric furnace and then opened to observe the state of the aqueous paint composition (the presence or absence of the phase separation and the increase in the viscosity). Specifically, after the above opening, first, the aqueous paint composition in the above glass container was observed with the eye to check the presence or absence of the phase separation. Thereafter, when the above glass container was tilted, a change in the flowing state of the aqueous paint composition (a change from that during the aforementioned sealing) was observed with the eye to check the presence or absence of the increase in the viscosity. Based on results of these observations, the evaluation was performed on the following standards:

○: Neither the increase in the viscosity nor the phase separation was seen.

X: At least either one of the increase in the viscosity and the phase separation was seen.

[Evaluations on Coated Film]:
<Preparation of Test Piece>:

A polypropylene plate (length 100 mm×width 70 mm, thickness 3 mm), which was to be a substrate, was washed with isopropanol, and then the aqueous paint composition was spray-coated onto the surface of this polypropylene plate so as to have a dry film thickness of 20 μm, and then heated at 70° C. for 5 minutes to form a coated film on the surface of the above polypropylene plate, thus obtaining a test piece being used for the following evaluations.

<Texturability>:

Five evaluators were made to touch the coated film surface of the test piece directly by hand and to compare its feel with that of a standard specimen plate which was an index of the texturability. Then, the evaluation was performed on the following standards. Incidentally, as the above standard specimen plate, a specimen plate having been provided by TOYOTA TECHNICAL CENTER was used.

○: Three or more evaluators judged that the test piece had a texturability equivalent to or more than that of the standard specimen plate.

X: It was two or fewer evaluators who judged that the test piece had a texturability equivalent to or more than that of the standard specimen plate.

<Marring Resistance>:

A crock meter (produced by ATLAS ELECTRIC DEVICE Co., device name: CM-5-1191 TYPE CM-5) was used to subject the surface of the coated film of the test piece to friction reciprocationally 50 times at strokes of 100 mm by a frictional rubber (on which glass beads (spherical, average particle diameter: 200 to 500 μm) had been press-stuck with a double coated tape) while a load of 500 g/cm$^2$ was applied thereto. The 60'-gloss values of the frictional surface and of the non-frictional surface were measured to evaluate them on the following standards:

○: The 60°-gloss value of the frictional surface was 1.6 times or smaller that of the non-frictional surface.

X: The 60°-gloss value of the frictional surface was larger than 1.6 times that of the non-frictional surface.

<Beef Tallow Staining Resistance>:

Beef tallow (reagent produced by Wako Pure Chemical Industries, Ltd.) was uniformly coated onto the surface of the coated film of the test piece in an amount of 2 g per 100 cm$^2$, and then cotton flannel cloth was further put thereon. Then, this test piece was left in an electric furnace of 80° C. for 1 week. After 1 week, the test piece was removed from the electric furnace and then washed with water and then air-dried. Then, two notches having a length of 2 cm were made in the surface of the coated film with a cutter knife so as to be in the form of a mark "X" (saltire), and then an adhesive tape was applied (press-stuck) onto the surface of the coated film so as to cover this mark "X". Thereafter, the adhesive tape was peeled from the test piece, and then the evaluation was performed on the following standards:

○: Peeling of the coated film was not seen.

X: Peeling of the coated film was seen.

<Strength (Film Strength)>:

The surface of the coated film of the test piece was scratched with pencils at an angle of 45°. Then, based on the highest hardness of the pencils that gave no scratch mark seen by visual observation, the evaluation was performed on the following standards:

○: The highest hardness is HB or higher.

X: The highest hardness is B or lower.

<Smoothness>:

The smoothness of the surface of the coated film of the test piece was observed visually and thereby evaluated on the following standards:

○: The surface of the coated film was smooth.

X: Unevenness was seen in the surface of the coated film.

<Water Resistance>:

The test piece was immersed in warm water of 40° C. for 10 days and then taken out and then wiped dry with cloth and then left at room temperature for 1 hour. Thereafter, eleven notches each longitudinally and laterally at intervals of 1 mm were made in the surface of the coated film with a cutter knife so that 100 squares would be made in the form of graph paper. Thereafter, an adhesive tape was applied (press-stuck) onto the surface of the coated film so as to cover all the above 100 squares. Thereafter, the adhesive tape was peeled from the test piece, and then the evaluation was performed on the following standards:

○: No square (coated film) was peeled from the substrate.

X: At least one square (coated film) was peeled from the substrate.

[Such as Measurement on Resin Beads]:

<Particle Diameter Compression Rate, Particle Diameter Recovery Rate>:

A load of 9.8 mN was applied to one resin bead for 2 seconds with a flat indenter having an indenter diameter of 50 μm, and then the load was removed. The amounts of displacement of the particle diameter, during the application of the load and during the removal of the load, were measured with a microcompression tester (produced by Shimadzu Corporation, device name: MCT-W) to calculate the particle diameter compression rate (CP) and the particle diameter recovery rate (R) from the following equations:

$$CP = B/A$$

$$R = [(B-C)/A]/(B/A)$$

(wherein: A is the average particle diameter (μm) of the resin beads; B is the difference length (μm) of the average particle diameter between before and after loading; and C is the difference length (μm) of the average particle diameter between before loading and after the removal of the load)

<Kinds of Resin Beads Used>:

In the Examples and the Comparative Examples, the acrylic resin beads (E) as used was any of the following (E1) to (E3), and the urethane resin beads (F) as used was any of the following (F1) to (F3).

Acrylic resin beads (E1):

Produced by SEKISUI PLASTICS CO., LTD., trade name: Techpolymer BM30X-8, average particle diameter: 8 μm, particle diameter compression rate: 37.4%, particle diameter recovery rate: 32.6%, solid component content: 100 wt %

Acrylic Resin Beads (E2):

Produced by Negami Chemical Industrial Co., Ltd., trade name: Art Pearl G800T, average particle diameter: 6 μm, particle diameter compression rate: 40.5%, particle diameter recovery rate: 21.9%, solid component content: 100 wt %

Acrylic Resin Beads (E3):

Produced by Ganz Chemical Co., Ltd., trade name: Ganz Pearl GM1001, average particle diameter: 10 μm, particle diameter compression rate: 37.9%, particle diameter recovery rate: 11.5%, solid component content: 100 wt %

Urethane Resin Beads (F1):

Produced by Negami Chemical Industrial Co., Ltd., trade name: Art Pearl U-600T, average particle diameter: 10 μm, particle diameter compression rate: 56.4%, particle diameter recovery rate: 7.0%, solid component content: 100 wt %

Urethane Resin Beads (F2):

Produced by Negami Chemical Industrial Co., Ltd., trade name: Art Pearl P-800T, average particle diameter: 6 μm, particle diameter compression rate: 49.2%, particle diameter recovery rate: 22.3%, solid component content: 100 wt %

Urethane Resin Beads (F3):

Produced by Negami Chemical Industrial Co., Ltd., trade name: Art Pearl HT-400T, average particle diameter: 13 μm, particle diameter compression rate: 19.4%, particle diameter recovery rate: 68.0%, solid component content: 100 wt %

PRODUCTION EXAMPLE 1-1

An amount of 622 parts of ethylene glycol monobutyl ether was charged into a 4-necked flask as equipped with stirring-blades, a thermometer, a temperature-controlling device, dropping-funnels and a condenser, and then heated to 280° F. Thereafter, while the same temperature was retained, each of a monomer component (containing 465 parts of n-butyl methacrylate, 285 parts of t-butyl methacrylate and 250 parts of methacrylic acid) and a mixture (containing 39 parts of t-butyl peroctoate and 227 parts of ethylene glycol monobutyl ether) was added dropwise into the flask over a period of 3 hours. Thereafter, the temperature of the contents of the flask was cooled to 225° F. and then, while the same temperature was retained, a mixture (containing 14 parts of t-butyl peroctoate and 84 parts of ethylene glycol monobutyl ether) was added dropwise into the flask over a period of 2 hours. After the completion of the addition, 115 parts of ethylene glycol monobutyl ether was added into the flask, and then the temperature was retained at the same temperature (225° F.) for 2 hours.

Thereafter, the temperature of the contents of the flask was cooled to 155° F., and then 182 parts of dimethylaminoethanol and 518 parts of deionized water were added in sequence, and then the temperature was retained at the same temperature for 30 minutes. After this retention, 2,451 parts of deionized water was added, and then the temperature was retained for further 30 minutes.

As a result of the aforementioned operation, a water-soluble pure acrylic resin solution (a1) of 20 wt % in solid component content (containing a water-soluble pure acrylic resin (A1)) was obtained.

The acid value (AV), glass transition temperature (Tg) and weight-average molecular weight (Mw) of the water-soluble pure acrylic resin (A1) in the resin solution (a1) are shown in Table 1.

PRODUCTION EXAMPLES 1-2 TO 1-5

Water-soluble pure acrylic resin solutions (a2) to (a4) of 20 wt % in solid component content (containing water-soluble pure acrylic resins (A2) to (A4)) and a water-soluble acrylic resin solution (a5) of 20 wt % in solid component content (containing a styrene-containing water-soluble acrylic resin (A5)) were obtained in the same way as of Production Example 1-1 except that the composition of the monomer component was changed as shown in Table 1.

The acid values (AV), glass transition temperatures (Tg) and weight-average molecular weights (Mw) of the water-soluble pure acrylic resins (A2) to (A4) and the styrene-containing water-soluble acrylic resin (A5) in the resin solutions are shown in Table 1.

TABLE 1

|  | Production Example 1-1 | Production Example 1-2 | Production Example 1-3 | Production Example 1-4 | Production Example 1-5 |
| --- | --- | --- | --- | --- | --- |
| Water-soluble acrylic resin solution | (a1) | (a2) | (a3) | (a4) | (a5) |

TABLE 1-continued

|  |  | Production Example 1-1 | Production Example 1-2 | Production Example 1-3 | Production Example 1-4 | Production Example 1-5 |
|---|---|---|---|---|---|---|
| Composition | n-BMA | 465 | — | 507 | — | 465 |
| of monomer | t-BMA | 285 | — | 171 | — | 85 |
| component | EMA | — | 690 | — | 701 | — |
| (parts) | MMA | — | 169 | — | 183 | — |
|  | MAA | 250 | — | 322 | — | 250 |
|  | AA | — | 141 | — | 116 | — |
|  | ST | — | — | — | — | 200 |
| Acid value (KOH mg/g) | | 162.9 | 110.0 | 209.8 | 90.3 | 162.9 |
| Tg (° C.) | | 74.2 | 74.2 | 74.2 | 74.2 | 73.0 |
| Mw | | 30,000 | 30,000 | 30,000 | 30,000 | 30,000 |

PRODUCTION EXAMPLE 2-1

An amount of 513 parts of titanium oxide (produced by E.I. du Pont de Nemours and Company, trade name: Typure R706, solid component content: 100 wt %) was added to 987 parts of the water-soluble pure acrylic resin solution (a1) and then dispersed thereinto with a sand grinder mill for 30 minutes to prepare a pigment paste (p1) of 47.4 wt % in solid component content.

PRODUCTION EXAMPLES 2-2 TO 2-5

Pigment pastes (p2) to (p5) of 47.4 wt % in solid component content were prepared in the same way as of Production Example 2-1 except that the water-soluble pure acrylic resin solutions (a2) to (a4) and the water-soluble acrylic resin solution (a5) were used in place of the water-soluble pure acrylic resin solution (a1).

EXAMPLE 1

An amount of 1,000 parts of an acrylic resin emulsion (b) (produced by NeoResins Inc., trade name: Neocryl A-6015, solid component content: 45 wt %) was placed into a mixing and dispersing container, and then 260 parts of the water-soluble pure acrylic resin solution (a1), 1,200 parts of a maleic-acid-modified chlorinated polypropylene resin emulsion (c) (produced by Toyo Kasei Kogyo Co., Ltd., trade name: Hardren EW5003, solid component content: 30 wt %), 1,048 parts of the pigment paste (p1), 920 parts of N-methylpyrrolidone, 227 parts of deionized water (i), 795 parts of the acrylic resin beads (E1), 227 parts of the urethane resin beads (F1), 149 parts of a wax (produced by ROHM & HAAS COMPANY, trade name: Luciwax, solid component content: 35 wt %), 14 parts of a defoaming agent (produced by Air Products Co., Ltd., trade name: Surfynol 104PA, solid component content: 50 wt %), 54 parts of a surfactant (produced by Air Products Co., Ltd., trade name: Dynol 604, solid component content: 100 wt %), 75 parts of a wetting agent (produced by Goldschmidt Chemical Corp., trade name: Polyflow KL-245, solid component content: 100 wt %) and 154 parts of a thickener (produced by ROHM & HAAS COMPANY, trade name: ASE-60, solid component content: 28 wt %) were added in sequence to mix and disperse them while stirring was carried out with a mixer (produced by MIDWEST MIXING, trade name: Air Driver Mixer). Thereafter, aging was carried out for 1 hour.

Thereafter, while stirring was carried out, 338 parts of a polycarbodiimide compound (D) (produced by Nisshinbo K. K., trade name: Carbodirite E-03A, solid component content: 40 wt %) and 580 parts of deionized water (ii) were further added to obtain an aqueous paint composition (1) of 39 wt % in solid component content. Incidentally, the equivalent ratio of the carbodiimide groups of the polycarbodiimide compound (D) relative to the carboxyl groups of the water-soluble pure acrylic resin (A1) in the water-soluble pure acrylic resin solution (a1) as used (D/A: carbodiimide groups/carboxyl groups) was 0.65.

The resulting aqueous paint composition (1), and a coated film obtained therefrom, were subjected to the various evaluations by the aforementioned methods. Their results are shown in Table 7.

EXAMPLES 2 TO 12

Aqueous paint compositions (2) to (12) were obtained in the same way as of Example 1 except that: as is shown in Tables 2 to 6, of the constitutional components as used, the water-soluble pure acrylic resin solution, the acrylic resin beads, the urethane resin beads and the pigment paste were changed as to kind and mixing-amount (parts), and the other constitutional components were changed as to mixing-amount (parts).

The resulting aqueous paint compositions (2) to (12), and coated-films obtained therefrom, were subjected to the various evaluations by the aforementioned methods. Their results are shown in Tables 7 to 10.

COMPARATIVE EXAMPLES 1 TO 12

Aqueous paint compositions (c1) to (c12) were obtained in the same way as of Example 1 except that: as is shown in Tables 2 to 6, of the constitutional components as used, the water-soluble pure acrylic resin solution, the acrylic resin beads, the urethane resin beads and the pigment paste were changed as to kind and mixing-amount (parts), and the other constitutional components were changed as to mixing-amount (parts).

The resulting aqueous paint compositions (c1) to (c12), and coated-films obtained therefrom, were subjected to the various evaluations by the aforementioned methods. Their results are shown in Tables 7 to 10.

TABLE 2

|  |  | Example 1 | Example 2 | Example 3 | Example 4 | Comparative Example 1 | Comparative Example 2 |
|---|---|---|---|---|---|---|---|
| Aqueous paint composition |  | (1) | (2) | (3) | (4) | (c1) | (c2) |
| Water-soluble acrylic resin solution | (a1) | 260 | 445 | 445 | 670 | 30 | 945 |
|  | (a2) | — | — | — | — | — | — |
|  | (a3) | — | — | — | — | — | — |
|  | (a4) | — | — | — | — | — | — |
|  | (a5) | — | — | — | — | — | — |
| Resin emulsion (b) |  | 1000 | 956 | 822 | 889 | 1022 | 800 |
| Resin emulsion (c) |  | 1200 | 1133 | 1333 | 1067 | 1333 | 1000 |
| Compound (D) |  | 338 | 408 | 408 | 495 | 248 | 603 |
| Resin beads | (E1) | 795 | 814 | 814 | 838 | 769 | 869 |
|  | (E2) | — | — | — | — | — | — |
|  | (E3) | — | — | — | — | — | — |
| Resin beads | (F1) | 227 | 233 | 233 | 240 | 220 | 248 |
|  | (F2) | — | — | — | — | — | — |
|  | (F3) | — | — | — | — | — | — |
| Pigment paste | (p1) | 1048 | 1072 | 1072 | 1108 | 1017 | 1147 |
|  | (p2) | — | — | — | — | — | — |
|  | (p3) | — | — | — | — | — | — |
|  | (p4) | — | — | — | — | — | — |
|  | (p5) | — | — | — | — | — | — |
| Wax |  | 149 | 151 | 151 | 157 | 143 | 163 |
| Defoaming agent |  | 14 | 15 | 15 | 15 | 14 | 16 |
| Surfactant |  | 54 | 55 | 55 | 57 | 52 | 59 |
| Wetting agent |  | 75 | 77 | 77 | 79 | 73 | 82 |
| Thickener |  | 154 | 157 | 157 | 164 | 150 | 168 |
| Deionized water | (i) | 227 | 227 | 227 | 227 | 227 | 227 |
|  | (ii) | 580 | 566 | 535 | 545 | 589 | 520 |
| Total |  | 807 | 793 | 762 | 772 | 816 | 747 |
| N-methylpyrrolidone |  | 920 | 905 | 870 | 881 | 931 | 852 |
| Solid component content (wt %) |  | 39.0 | 39.0 | 39.0 | 39.0 | 39.0 | 39.0 |
| D/A (equivalent ratio) |  | 0.65 | 0.65 | 0.65 | 0.65 | 0.65 | 0.65 |

TABLE 3

|  |  | Example 5 | Example 6 | Comparative Example 3 | Comparative Example 4 | Comparative Example 5 | Comparative Example 6 |
|---|---|---|---|---|---|---|---|
| Aqueous paint composition |  | (5) | (6) | (c3) | (c4) | (c5) | (c6) |
| Water-soluble acrylic resin solution | (a1) | 535 | 275 | 565 | 240 | 565 | 240 |
|  | (a2) | — | — | — | — | — | — |
|  | (a3) | — | — | — | — | — | — |
|  | (a4) | — | — | — | — | — | — |
|  | (a5) | — | — | — | — | — | — |
| Resin emulsion (b) |  | 956 | 956 | 956 | 956 | 956 | 956 |
| Resin emulsion (c) |  | 1133 | 1133 | 1133 | 1133 | 1133 | 1133 |
| Compound (D) |  | 408 | 408 | 408 | 408 | 408 | 408 |
| Resin beads | (E1) | 628 | 1105 | 535 | 1210 | 616 | 1128 |
|  | (E2) | — | — | — | — | — | — |
|  | (E3) | — | — | — | — | — | — |
| Resin beads | (F1) | 128 | 465 | 128 | 476 | 47 | 558 |
|  | (F2) | — | — | — | — | — | — |
|  | (F3) | — | — | — | — | — | — |
| Pigment paste | (p1) | 934 | 1329 | 888 | 1383 | 888 | 1383 |
|  | (p2) | — | — | — | — | — | — |
|  | (p3) | — | — | — | — | — | — |
|  | (p4) | — | — | — | — | — | — |
|  | (p5) | — | — | — | — | — | — |
| Wax |  | 131 | 189 | 126 | 197 | 126 | 197 |
| Defoaming agent |  | 13 | 18 | 12 | 19 | 12 | 19 |
| Surfactant |  | 48 | 68 | 45 | 71 | 45 | 71 |
| Wetting agent |  | 67 | 95 | 64 | 99 | 64 | 99 |
| Thickener |  | 139 | 196 | 132 | 204 | 132 | 204 |
| Deionized water | (i) | 227 | 227 | 227 | 227 | 227 | 227 |
|  | (ii) | 309 | 1027 | 175 | 1130 | 175 | 1130 |
| Total |  | 536 | 1254 | 402 | 1357 | 402 | 1357 |
| N-methylpyrrolidone |  | 611 | 1432 | 460 | 1548 | 460 | 1548 |
| Solid component content (wt %) |  | 39.0 | 39.0 | 39.0 | 39.0 | 39.0 | 39.0 |
| D/A (equivalent ratio) |  | 0.65 | 0.65 | 0.65 | 0.65 | 0.65 | 0.65 |

TABLE 4

|  |  | Example 7 | Example 8 | Comparative Example 7 | Comparative Example 8 |
|---|---|---|---|---|---|
| Aqueous paint composition |  | (7) | (8) | (c7) | (c8) |
| Water-soluble acrylic resin solution | (a1) | 495 | 405 | 540 | 360 |
|  | (a2) | — | — | — | — |
|  | (a3) | — | — | — | — |
|  | (a4) | — | — | — | — |
|  | (a5) | — | — | — | — |
| Resin emulsion (b) |  | 956 | 956 | 956 | 956 |
| Resin emulsion (c) |  | 1133 | 1133 | 1133 | 1133 |
| Compound (D) |  | 188 | 565 | 0 | 753 |
| Resin beads | (E1) | 753 | 858 | 700 | 911 |
|  | (E2) | — | — | — | — |
|  | (E3) | — | — | — | — |
| Resin beads | (F1) | 215 | 245 | 200 | 260 |
|  | (F2) | — | — | — | — |
|  | (F3) | — | — | — | — |
| Pigment paste | (p1) | 994 | 1132 | 926 | 1201 |
|  | (p2) | — | — | — | — |
|  | (p3) | — | — | — | — |
|  | (p4) | — | — | — | — |
|  | (p5) | — | — | — | — |
| Wax |  | 140 | 160 | 131 | 171 |
| Defoaming agent |  | 13 | 15 | 13 | 16 |
| Surfactant |  | 51 | 58 | 47 | 62 |
| Wetting agent |  | 71 | 81 | 66 | 86 |
| Thickener |  | 146 | 168 | 136 | 179 |
| Deionized water | (i) | 227 | 227 | 227 | 227 |
|  | (ii) | 480 | 627 | 406 | 701 |
| Total |  | 707 | 854 | 633 | 928 |
| N-methylpyrrolidone |  | 806 | 974 | 722 | 1059 |
| Solid component content (wt %) |  | 39.0 | 39.0 | 39.0 | 39.0 |
| D/A (equivalent ratio) |  | 0.30 | 0.90 | 0 | 1.20 |

TABLE 5

|  |  | Example 9 | Comparative Example 9 | Example 10 | Comparative Example 10 |
|---|---|---|---|---|---|
| Aqueous paint composition |  | (9) | (c9) | (10) | (c10) |
| Water-soluble acrylic resin solution | (a1) | 445 | 945 | 445 | 945 |
|  | (a2) | — | — | — | — |
|  | (a3) | — | — | — | — |
|  | (a4) | — | — | — | — |
|  | (a5) | — | — | — | — |
| Resin emulsion (b) |  | 956 | 800 | 956 | 800 |
| Resin emulsion (c) |  | 1133 | 1000 | 1133 | 1000 |
| Compound (D) |  | 408 | 603 | 408 | 603 |
| Resin beads | (E1) | — | — | 814 | 869 |
|  | (E2) | 814 | — | — | — |
|  | (E3) | — | 869 | — | — |
| Resin beads | (F1) | 233 | 248 | — | — |
|  | (F2) | — | — | 233 | — |
|  | (F3) | — | — | — | 248 |
| Pigment paste | (p1) | 1072 | 1147 | 1072 | 1147 |
|  | (p2) | — | — | — | — |
|  | (p3) | — | — | — | — |
|  | (p4) | — | — | — | — |
|  | (p5) | — | — | — | — |
| Wax |  | 151 | 163 | 151 | 163 |
| Defoaming agent |  | 15 | 16 | 15 | 16 |
| Surfactant |  | 55 | 59 | 55 | 59 |
| Wetting agent |  | 77 | 82 | 77 | 82 |
| Thickener |  | 157 | 168 | 157 | 168 |
| Deionized water | (i) | 227 | 227 | 227 | 227 |
|  | (ii) | 566 | 520 | 566 | 520 |
| Total |  | 793 | 747 | 793 | 747 |
| N-methylpyrrolidone |  | 905 | 852 | 905 | 852 |
| Solid component content (wt %) |  | 39.0 | 39.0 | 39.0 | 39.0 |
| D/A (equivalent ratio) |  | 0.65 | 0.65 | 0.65 | 0.65 |

TABLE 6

|  |  | Example 11 | Example 12 | Comparative Example 11 | Comparative Example 12 |
|---|---|---|---|---|---|
| Aqueous paint composition |  | (11) | (12) | (c11) | (c12) |
| Water-soluble acrylic resin solution | (a1) | — | — | — | — |
|  | (a2) | 475 | — | — | — |
|  | (a3) | — | 415 | — | — |
|  | (a4) | — | — | 1010 | — |
|  | (a5) | — | — | — | 445 |
| Resin emulsion (b) |  | 956 | 956 | 800 | 956 |
| Resin emulsion (c) |  | 1133 | 1133 | 1000 | 1133 |
| Compound (D) |  | 275 | 525 | 333 | 408 |
| Resin beads | (E1) | 777 | 847 | 793 | 814 |
|  | (E2) | — | — | — | — |
|  | (E3) | — | — | — | — |
| Resin beads | (F1) | 222 | 242 | 227 | 233 |
|  | (F2) | — | — | — | — |
|  | (F3) | — | — | — | — |
| Pigment paste | (p1) | — | — | — | — |
|  | (p2) | 1025 | — | — | — |
|  | (p3) | — | 1117 | — | — |
|  | (p4) | — | — | 1048 | — |
|  | (p5) | — | — | — | 1072 |
| Wax |  | 146 | 157 | 149 | 151 |
| Defoaming agent |  | 14 | 15 | 14 | 15 |
| Surfactant |  | 53 | 57 | 54 | 55 |
| Wetting agent |  | 73 | 80 | 75 | 77 |
| Thickener |  | 150 | 164 | 154 | 157 |
| Deionized water | (i) | 227 | 227 | 227 | 227 |
|  | (ii) | 513 | 612 | 415 | 566 |
| Total |  | 740 | 839 | 642 | 793 |
| N-methylpyrrolidone |  | 846 | 957 | 732 | 905 |
| Solid component content (wt %) |  | 39.0 | 39.0 | 39.0 | 39.0 |
| D/A (equivalent ratio) |  | 0.65 | 0.65 | 0.65 | 0.65 |

TABLE 7

|  | Example 1 | Example 2 | Example 3 | Example 4 | Comparative Example 1 | Comparative Example 2 |
|---|---|---|---|---|---|---|
| Texturability | ◯ | ◯ | ◯ | ◯ | ◯ | ◯ |
| Water resistance | ◯ | ◯ | ◯ | ◯ | ◯ | ◯ |
| Marring resistance | ◯ | ◯ | ◯ | ◯ | ◯ | ◯ |
| Beef tallow staining resistance | ◯ | ◯ | ◯ | ◯ | X | ◯ |
| Film strength | ◯ | ◯ | ◯ | ◯ | X | ◯ |
| Smoothness | ◯ | ◯ | ◯ | ◯ | ◯ | ◯ |
| Storage stability | ◯ | ◯ | ◯ | ◯ | ◯ | X |

TABLE 8

|  | Example 5 | Example 6 | Comparative Example 3 | Comparative Example 4 | Comparative Example 5 | Comparative Example 6 |
|---|---|---|---|---|---|---|
| Texturability | ○ | ○ | X | ○ | X | ○ |
| Water resistance | ○ | ○ | X | ○ | ○ | X |
| Marring resistance | ○ | ○ | ○ | X | X | ○ |
| Beef tallow staining resistance | ○ | ○ | ○ | X | X | ○ |
| Film strength | ○ | ○ | ○ | ○ | ○ | ○ |
| Smoothness | ○ | ○ | ○ | X | ○ | X |
| Storage stability | ○ | ○ | ○ | ○ | ○ | ○ |

TABLE 9

|  | Example 7 | Example 8 | Comparative Example 7 | Comparative Example 8 |
|---|---|---|---|---|
| Texturability | ○ | ○ | ○ | ○ |
| Water resistance | ○ | ○ | ○ | X |
| Marring resistance | ○ | ○ | ○ | ○ |
| Beef tallow staining resistance | ○ | ○ | ○ | X |
| Film strength | ○ | ○ | X | ○ |
| Smoothness | ○ | ○ | ○ | ○ |
| Storage stability | ○ | ○ | ○ | X |

TABLE 10

|  | Example 9 | Comparative Example 9 | Example 10 | Comparative Example 10 | Example 11 | Example 12 | Comparative Example 11 | Comparative Example 12 |
|---|---|---|---|---|---|---|---|---|
| Texturability | ○ | ○ | ○ | ○ | ○ | ○ | ○ | ○ |
| Water resistance | ○ | ○ | ○ | ○ | ○ | ○ | ○ | ○ |
| Marring resistance | ○ | X | ○ | X | ○ | ○ | ○ | ○ |
| Beef tallow staining resistance | ○ | ○ | ○ | ○ | ○ | ○ | X | X |
| Film strength | ○ | ○ | ○ | ○ | ○ | ○ | X | ○ |
| Smoothness | ○ | ○ | ○ | ○ | ○ | ○ | ○ | ○ |
| Storage stability | ○ | X | ○ | X | ○ | ○ | X | ○ |

INDUSTRIAL APPLICATION

The aqueous paint composition according to the present invention is, for example, suitable as a paint which is used for coating of such as automobile interior parts and audio-visual equipment parts.

The coated article according to the present invention is suitable for such as automobile interior parts and audio-visual equipment parts.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous paint composition, which is an aqueous paint composition comprising a water-soluble pure acrylic resin (A) as a binder resin and a polycarbodiimide compound (D) as a crosslinking agent;
    with the aqueous paint composition further comprising acrylic resin beads (E) and urethane resin beads (F), wherein:
    in terms of solid component, the ratio of the water-soluble pure acrylic resin (A) relative to 100 parts by weight of the binder resin is in the range of 17 to 30 parts by weight, and the ratios of the acrylic resin beads (E) and of the urethane resin beads (F) relative to 100 parts by weight of the total of the binder resin and the crosslinking agent are in the range of 52 to 98 parts by weight and in the range of 10 to 42 parts by weight respectively; and
    the equivalent ratio of the carbodiimide groups of the polycarbodiimide compound (D) relative to the carboxyl groups of the water-soluble pure acrylic resin (A) is in the range of 0.1 to 1.

2. An aqueous paint composition according to claim 1, wherein: the particle diameter compression rate of the acrylic resin beads (E) is 30% or larger; the particle diameter recovery rate of the acrylic resin beads (E) is 15% or larger; and the particle diameter compression rate of the urethane resin beads (F) is 45% or larger.

3. An aqueous paint composition according to claim 1, wherein the acid value of the water-soluble pure acrylic resin (A) is 100 KOHmg/g or larger.

4. An aqueous paint composition according to claim 1, wherein: the binder resin contains an emulsion-type acrylic resin (B); and, in terms of solid component, the ratio of the emulsion-type acrylic resin (B) relative to 100 parts by weight of the binder resin is in the range of 35 to 48 parts by weight.

5. An aqueous paint composition according to claim 1, wherein: the binder resin contains an emulsion-type maleic-acid-modified chlorinated polypropylene resin (C); and, in terms of solid component, the ratio of the emulsion-type maleic-acid-modified chlorinated polypropylene resin (C) relative to 100 parts by weight of the binder resin is in the range of 29 to 42 parts by weight.

6. A coated article, which is coated with the aqueous paint composition as defined in claim 1.

* * * * *